United States Patent [19]
Chaudhari et al.

[11] Patent Number: 6,124,914
[45] Date of Patent: Sep. 26, 2000

[54] METHOD AN APPARATUS FOR FORMING AN ALIGNMENT PATTERN ON A SURFACE USING A PARTICLE BEAM USEFUL FOR A LIQUID CRYSTAL

[75] Inventors: Praveen Chaudhari, Briarcliff Manor; James Andrew Lacey, Mahopac; Shui-Chih Alan Lien, Briarcliff Manor, all of N.Y.

[73] Assignee: International Business Machines Corporation, Armonk, N.Y.

[21] Appl. No.: 08/644,788

[22] Filed: May 10, 1996

[51] Int. Cl.⁷ .................................................. G02F 1/1337
[52] U.S. Cl. ........................ 349/129; 349/124; 349/125
[58] Field of Search ..................................... 349/124, 129

[56] References Cited

U.S. PATENT DOCUMENTS

| | | | |
|---|---|---|---|
| 4,030,997 | 6/1977 | Miller et al. | 204/192 |
| 4,153,529 | 5/1979 | Little et al. | 204/192 |
| 5,030,322 | 7/1991 | Shimada et al. | 156/655 |
| 5,623,354 | 4/1997 | Lien et al. | 349/124 |
| 5,629,056 | 5/1997 | Koike et al. | 349/123 |
| 5,648,829 | 7/1997 | Yano | 349/129 |
| 5,691,792 | 11/1997 | Mizushima et al. | 349/124 |

FOREIGN PATENT DOCUMENTS

| | | |
|---|---|---|
| 1192160 | 8/1985 | Canada . |
| 2-259725 | 10/1990 | Japan . |
| 6-130391 | 5/1994 | Japan . |
| 6-294964 | 10/1994 | Japan . |
| 7-56172 | 3/1995 | Japan . |

OTHER PUBLICATIONS

DT 2818–079—Siemens, Nov. 1979 abstract.
DT 2815–481—Braun AG., Oct. 1979 abstract.
JP 3–217823—Seiko Epson, Sep. 1991 abstract.
JP 4–63323—Seiko Epson, Feb. 1992 abstract.
JP 4–40422—Canon (Hideyuki et al), Feb. 1992 abstract.

*Primary Examiner*—William L. Sikes
*Assistant Examiner*—J. Ngo
*Attorney, Agent, or Firm*—Daniel P. Morris

[57] ABSTRACT

A method of generating a patterned alignment direction on an alignment surface for a liquid crystal display cell is described. The cell is formed by forming a first alignment direction on an alignment surface, such as a polyimide surface of the cell. A second alignment direction is formed on the alignment surface. The first and second alignment directions are formed by a variety of sequences of treatments. An example of a first sequence is a first step of rubbing the alignment surface and thereafter a second step of selectively exposing (preferably using a mask) the alignment surface to a treatment selected from the group of exposure to electromagnetic radiation and exposure to a particle beam. Another example of a sequence is a first step of exposing the alignment surface to a treatment selected from the group of electromagnetic radiation and a particle beam thereafter selectively exposing (preferably through a mask) the alignment surface to another particle beam.

20 Claims, 9 Drawing Sheets

METHOD AN APPARATUS FOR FORMING AN ALIGNMENT PATTERN ON A SURFACE USING A PARTICLE BEAM USEFUL FOR A LIQUID CRYSTAL

CROSS REFERENCE TO RELATED APPLICATION

U.S. Patent Application Serial No. entitled, "ATOMIC BEAM ALIGNMENT OF LIQUID CRYSTALS", the teaching of which is incorporated herein by reference.

FIELD OF THE INVENTION

The present invention is directed to a method of forming an alignment pattern on a surface by exposing the surface to a particle beam, such as an atomic or ion beam from more than one direct, through a mask and in combination with rubbing so that the surface will act as an alignment layer preferably for a liquid crystal material which can be used to form a liquid crystal display cell.

BACKGROUND

Thin-film-transistor driving liquid crystal displays (TFT-LCDs) are widely used in the note book computer and portable TV. There is a tend that the application of TFT-LCD is expanding to desk computer and large area TV. Liquid Crystal displays have advantages of low power consumption, low weight and reasonable good optical performance. However, its viewing angle is much worse than CRT, especially in the vertical viewing zone. To solve the viewing angle problem of liquid crystal display, many muti-domain methods were proposed. Among them are mask rubbing two-domain method[11], fringe field two-domain method[12], double alignment layer two-domain method[13] and UV treatment two-domain method[14]. These methods are either too complicated in process or they may cause other problems, such as image sticking. In this invention, new muti-domain methods based on the ion beam alignment technology are described.

Aligned liquid crystals are widely used in flat panel display technology. They are aligned by inducing anisotropy on the surface of a substrate. This surface is usually a polymer such as polyimide, coated on a glass substrate[1]. There are a number of ways of introducing anisotropy on the surface: rubbing[2], stretching a polymer[3], a Langmuir-Boldgett film[4], a grating structure produced by microlithography[5], oblique angle deposition of $SiO_x$[6], and polarized UV radiation of polymer films[7]. The pervasive method used in aligning liquid crystal displays available on the market today is rubbing a polyimide film with a velvet cloth. This method has some drawbacks[8]. These include the debris left by the cloth during the rubbing process in an otherwise clean room environment; concern with electrostatic discharging and its influence on the electronic circuitry below the thin polyimide film; and rubbing, being a macroscopic process, does not readily lend itself to aligning liquid crystals in different directions at the spatial size of a pixel, which is usually of the order of a hundred micrometers. This local alignment is desirable to obtain a multidomain structure, which significantly increases the angle of viewing of the display. The limited angle of viewing of current liquid crystal displays is one of the limitations of this technology. We describe a new non-contact method of aligning liquid crystals. This method circumvents the problems posed by the rubbing technique.

REFERENCES CITED

1. See, for example, D. -S. Seo, H. Matsuda, J. Ishizaki, Y. Lamura, and S. Kobayashi, SID Digest 1993, p. 953.
2. See O. Kehmann (1906) and P. Chatelain (1943), cited by P. G. deGennes and J. Prost, "The Physics of Liquid Crystals," Clarendon Press, Oxford (1993) p. 109, 161.
3. H. Aoyama, Y. Yamazaki, M. Matsuura, H. Mada, and S. Kobayashi, Mol. Cryst. Liq. Cryst. 72, 127 (1981).
4. H. Ikeno, A. Oshaki, M. Nitto, N. Ozaki, Y. Yokoyama. K. Kakaya, and S. Kobayashi, Jpn. J. Appl. Phys., 27, L475, (1988).
5. M. Nakamura and M. Ura, J. Appl. Phys., 52, 210 (1981).
6. J. Ienuing, Appl. Phys. Lett., 21, 173 (1982).
7. M. Schadt, K. Suhmitt, V. Kozinkov, and V. Chiqvinov, Jpn. J. Appl. Phys., 31, 2155 (1992).
8. S. Kobayashi and Y. Limura, SPIE, 2175, 123 (1994).
9. U.S. Pat. No. 5,030,322, July 1991, Shimada et al.
10. Japan JP 3217823, August 1991.
11. S. Tanuma, Y. Koike and H. Yoshida: Japan Patent, JP-106624.
12. Shui-Chih A. Lien and Richard A. John: U.S. Pat. No. 5,309,264.
13. Y. Koide, T. Kamada, K. Okamoto, M. Ohashi, I. Tomita and M. Okabe: SID 92 Dig., P. 798 (1992).
14. A. Lien, R. A. John, M. Angelopoulos, K. W. Lee, H. Takano, K. Tajima and A. Takenaka, Appl. Phys. Lett. 67, 3108 (1995).

It is an object of the present invention to provide an improved method of providing a characteristic having a pattern to a surface to which liquid crystal molecules align.

It is another object of the present invention to provide such patterned characteristic using a particle beam, such as an atomic or ion beam.

BRIEF DESCRIPTION OF THE DRAWINGS

Further objects, features, and advantages of the present invention will become apparent from a consideration of the following detailed description of the invention when read in conjunction with the drawing FIGS. , in which.

SUMMARY OF THE INVENTION

An aspect of the present invention is a method of generating a patterned alignment direction on an alignment surface from more than one direction, through a mask, and/or in combination with rubbing an exposure to electromagnetic radiation, preferably for a liquid crystal display cell, by directing a particle beam at the alignment surface, wherein the particle beam is directed at the surface at an adjustable energy, at an adjustable angle with respect to the alignment surface and at an adjustable time to adjust the pretilt angle of a liquid crystal molecule with respect to the alignment surface.

DETAILED DESCRIPTION

A low energy beam of Argon ions is used to bombard the surface of a polyimide film. The Argon beam produces directional alignment when the beam is at an angle other than perpendicular to the surface. The advantages of atomic beam induced alignment over the other techniques are (i) non-contact alignment, (ii) a low energy beam ensures that only the surface layers are effected so that the number of radicals induced by broken bonds, as for example under UV radiation, are a minimum. This avoids charge build up when a voltage is applied across a liquid crystal cell, and (iii) large area uniform and parallel beams can be readily obtained; a problem with oblique deposition of SiOx and, (iv) atomic beams are well known to the electronics manufacturing community and are compatible with a clean room environment, (v) atomic beams can be used to align both surfaces of a thin polymer film, which is self-supporting.

However, in spite of their many advantages, neutral beams of energetic particles can also cause damage of the polyimide resulting in broken bonds which provide a deleterious time dependent response in the liquid crystal when a voltage is applied to operate the display. For this reason it is highly desirable to use a low energy beam; in fact, of energies comprising greater than 25 volts, rather than the hundreds of volts described in the literature[9,10]. These low energy beams modify the surface layer sufficiently to induce alignment without any measurable degradation. We shall present experimental data to support this conclusion.

Figure 1:
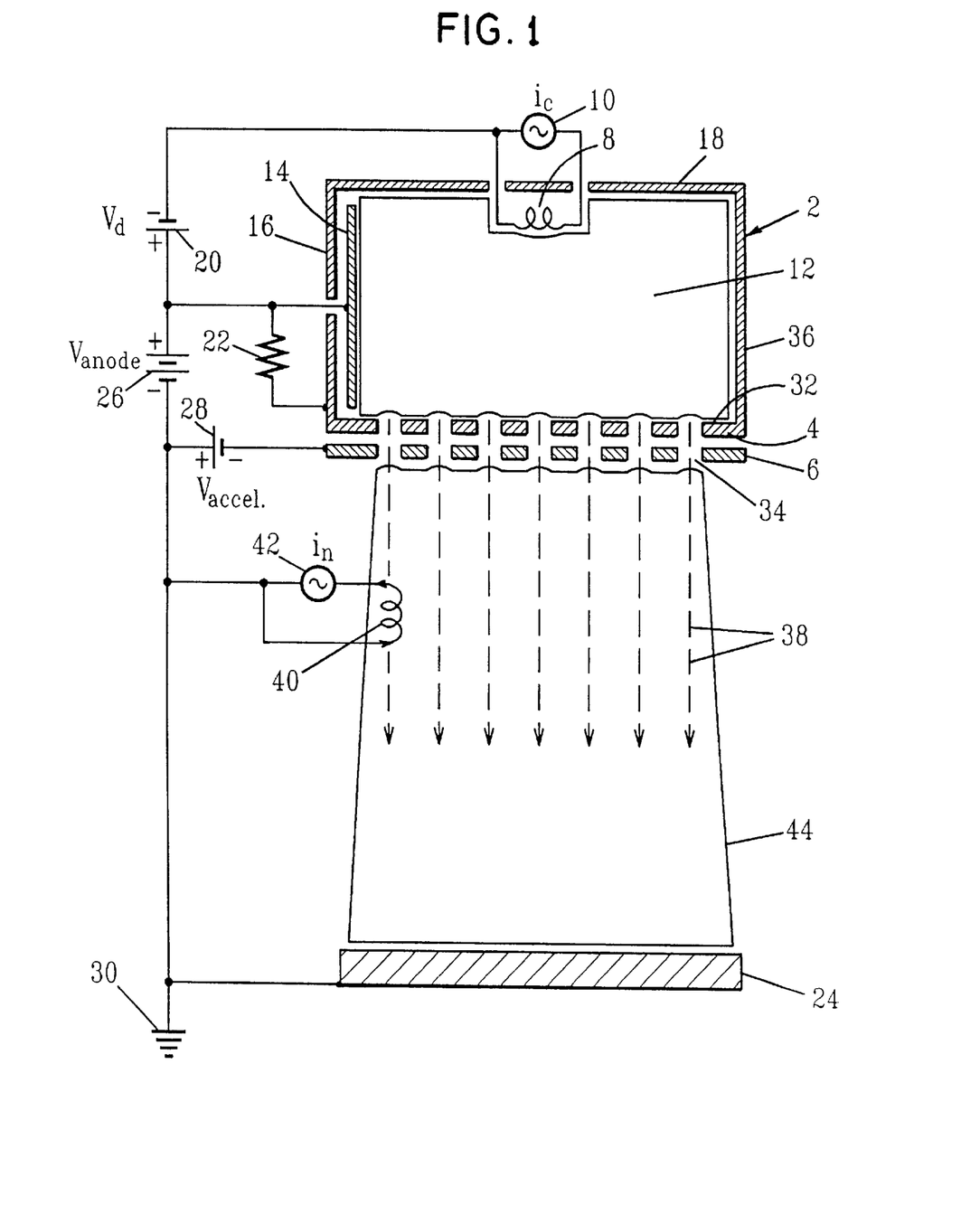
FIG. 1 is a schematic drawing of the ion beam system used for the purpose of this invention.

A schematic drawing of the ion beam system used for the purposes of this invention is shown in FIG. 1. The ion source is commercially available and the accelerating voltage in this source could be varied from 75V to 500V. The current density or the number of ions, per square cm was approximately 100–500 $\mu$A per sq. cm. and was one of the variables that was investigated. The substrate, which was bombarded with the atomic beam was made of glass on which indium tin oxide and polyimide films had been deposited. Substrates containing thin film transistors covered by a polyimide film were also investigated. A mylar film, which is self-supporting was investigated. These are exemplary only and not limiting. These substrates were places at various angles to the incoming atomic beam shown in FIG. 1. Argon gas was used as the plasma source. The ion beam apparatus and its operation are well known in the semiconductor industry.

FIG. 1 shows a schematic of the physical and electrical configuration of a Ion Source. The principals of operation are best understood by realizing that an ion source consists of three regions. Ions are generated in the discharge plasma region (12), accelerated through the extraction region (6) and travel trough the beam plasma region (44).

Ions are generated in the discharge plasma region (12) by electron bombardment of neutral gas atoms. Electrons are emitted by a hot filament, cathode (8), and accelerated by a potential difference, Vd (20), between the cathode (8) and anode (14). This voltage is typically about 40V, which is several times higher then the Ar ionization voltage of 15.8 eV, and is used to establish a glow discharge. Before the discharge starts, the source body (2) is at the anode (14) potential. After the discharge starts, however, the connecting resistor (22) allows the source body (2) and the screen grid (4) to float to the cathode potential, directing the discharge current to the anode. The discharge plasma (12) establishes itself between the cathode (8), anode (14), chamber walls (16, 18, 36 and 32) and the screen grid (4).

To extract the ion beam from the discharge plasma, we raise the anode voltage, Vanode (26) to a positive voltage above ground. Raising the anode potential increases the plasma potential to nearly the same value. Thus any ion leaving the discharge plasma and striking the grounded target (24) surface arrives with the energy determined by the anode potential. The accelerator grid (6) is held at a negative potential and the ions pass through the apertures (34) in the accelerator grid without striking it and form a collimated beam (44), eventually striking the target (24) which is held at ground potential (30).

Since the substrates we use are insulating, when the ion beams hit the substrates, there is no current path available for the electron flow to meet the incoming flux of positive ions and the insulating surface would charge positive. To eliminate this charging, a hot filament or neutralizer (42) is immersed in the beam plasma (44) which adequately supplies electrons to any region of the beam or the substrate surface which would charge positive.

After exposure to ion beams a pair of glass plates were assembled together with a five micron spacer. The space between the two plates was evacuated and subsequently filled with a nematic liquid crystal. It was observed that the liquid crystal was aligned by the atomic beam in much the same way that rubbing by a cloth does.

Figure 2:
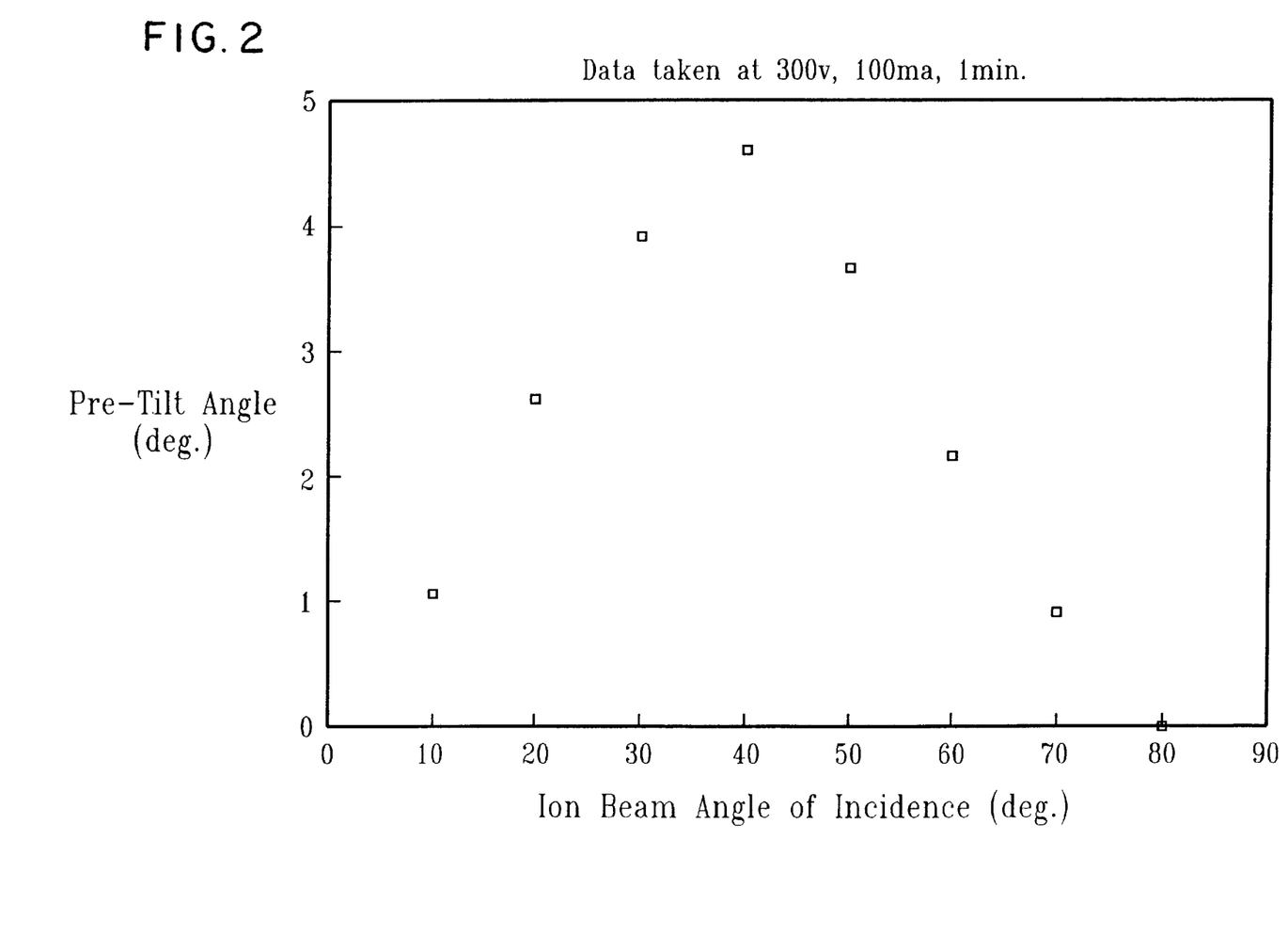
FIG. 2 is a plot of pretilt angle as a function of the angle of incidence of the incident beam as shown in FIG. 6.
Figure 3:
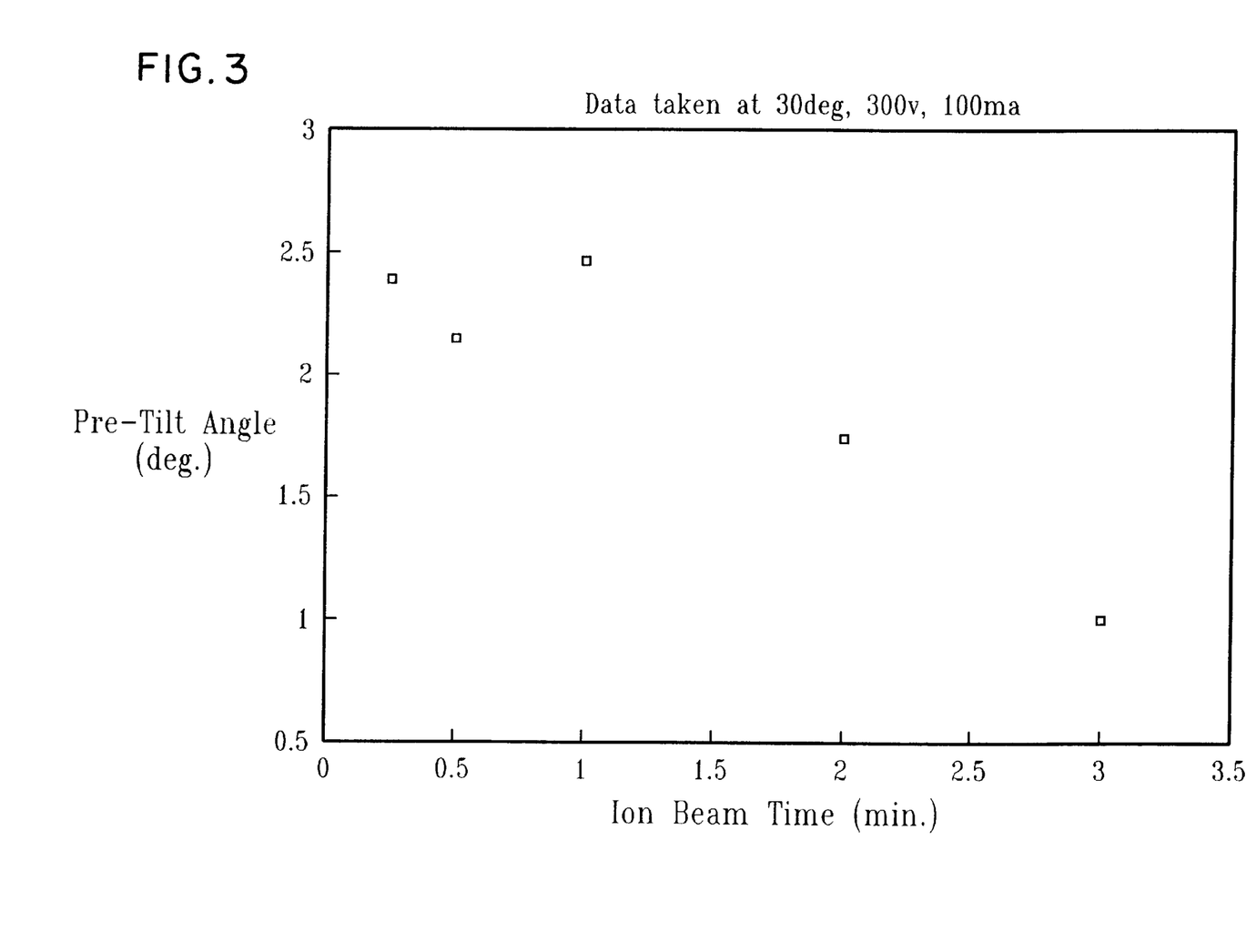
FIG. 3 is a plot of pretilt angle with time of exposure to incident beam.
Figure 4:
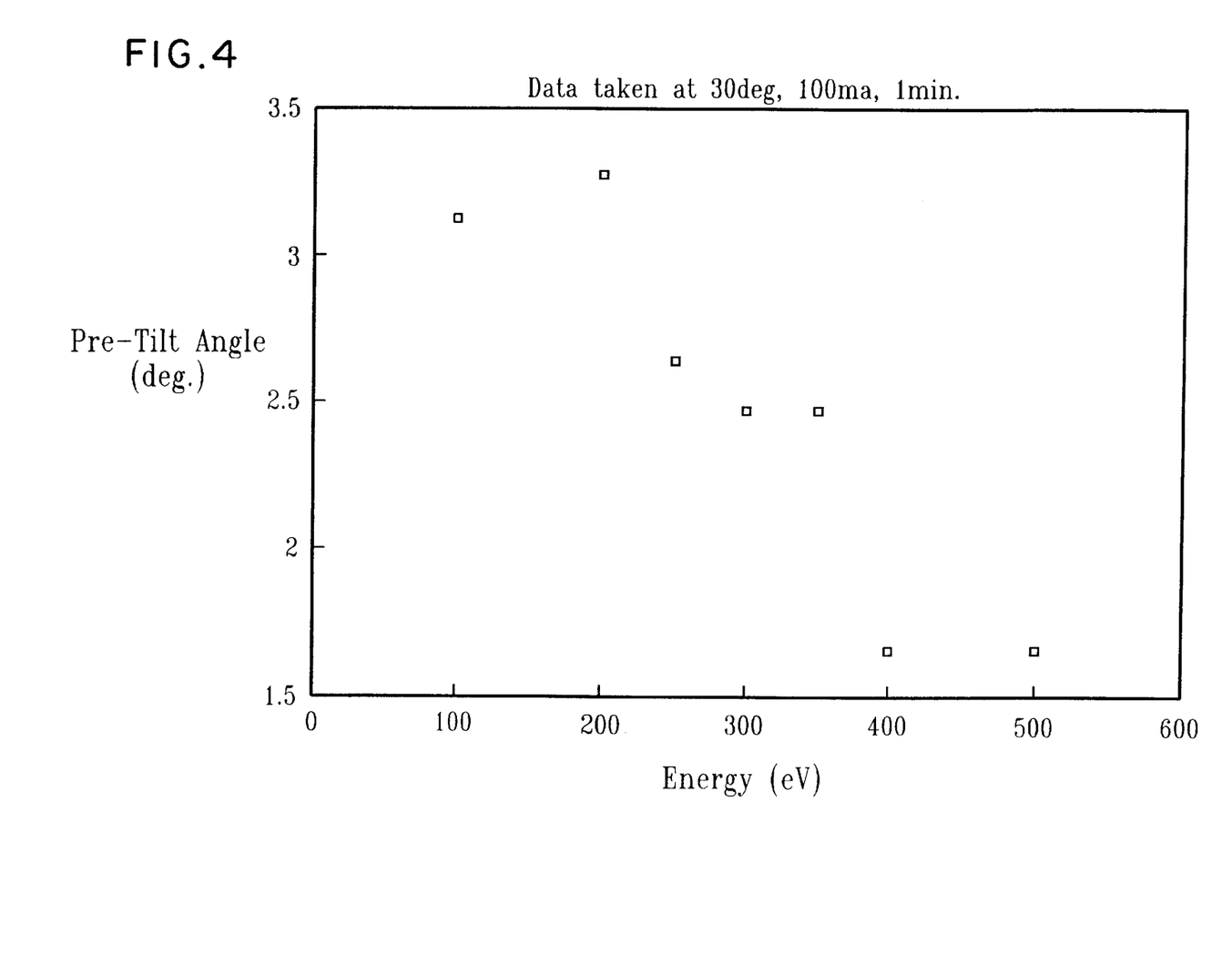
FIG. 4 is a plot of pretilt angle with accelerating voltage.
Figure 6:
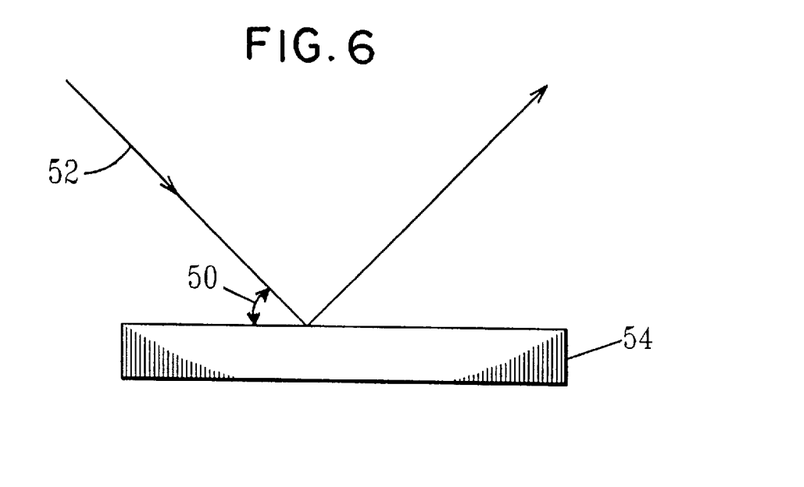
FIG. 6 schematically shows a beam according to the present invention incident on a surface of a substrate being exposed.
Figure 7:
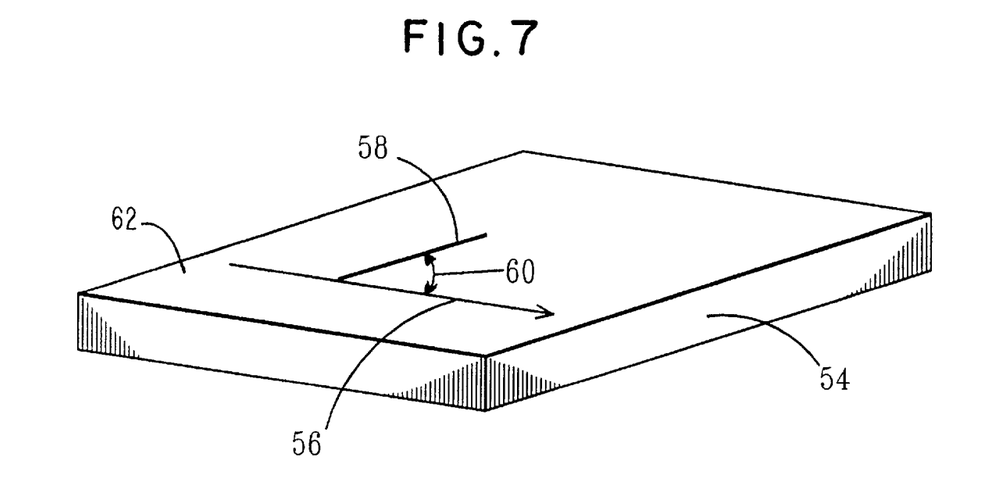
FIG. 7 schematically shows the pretilt angle of a liquid crystal molecule.

The alignment was strong and a measure of considerable interest to the display technology community, called the tilt angle, was also determined as a function of the angle, time, and energy of the beam. For active matrix liquid displays it is desirable to have the pretilt angle be larger than a few degrees. The operation of a liquid crystal display and tilt angle are described in U.S. application Ser. No. 08/194,239 filed Feb. 20, 1994 and assigned to the assignee of the present invention, the teaching of which is incorporated herein by reference. FIG. 7 schematically shows substrate 54 of FIG. 6 with the alignment directory 56 formed by the method of the present invention with a liquid crystal molecule schematically shown as 58 which make an angle 60 with respect to surface 62 of substrate 54. Angle 60 is the pretilt angle. We show in FIG. 2 that pretilt angle as a function of the angle 50 of the incident beam 52 with respect to substrate 54. This is shown for two accelerating voltages. There is a maximum in the value of the pretilt at 45 degrees. We show in FIG. 3 that the variation in the value of pretilt angle with time of exposure at a constant beam current. Finally, in FIG. 4 we show how the pretilt angle changes with the accelerating voltage.

It is clear from these measurements that the pretilt angle satisfies the needs of display technology and that its variation with atomic beam parameters such as voltage and current are controllable. We next investigated the effects of ion beam accelerating voltages on the temporal response of a display device under a voltage. In this crucial test we search for stray charge either in the polyimide or the liquid crystal cell.

Figure 5A:
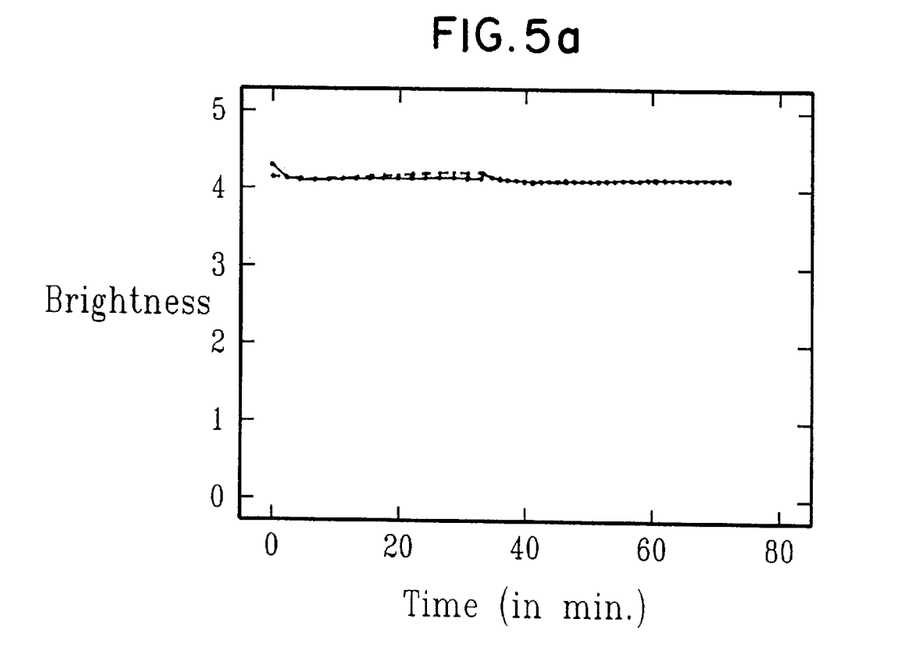
FIGS. 5a and b show the brightness vs. time of a substrate exposed according to the present invention used in a liquid crystal cell.
Figure 5B:
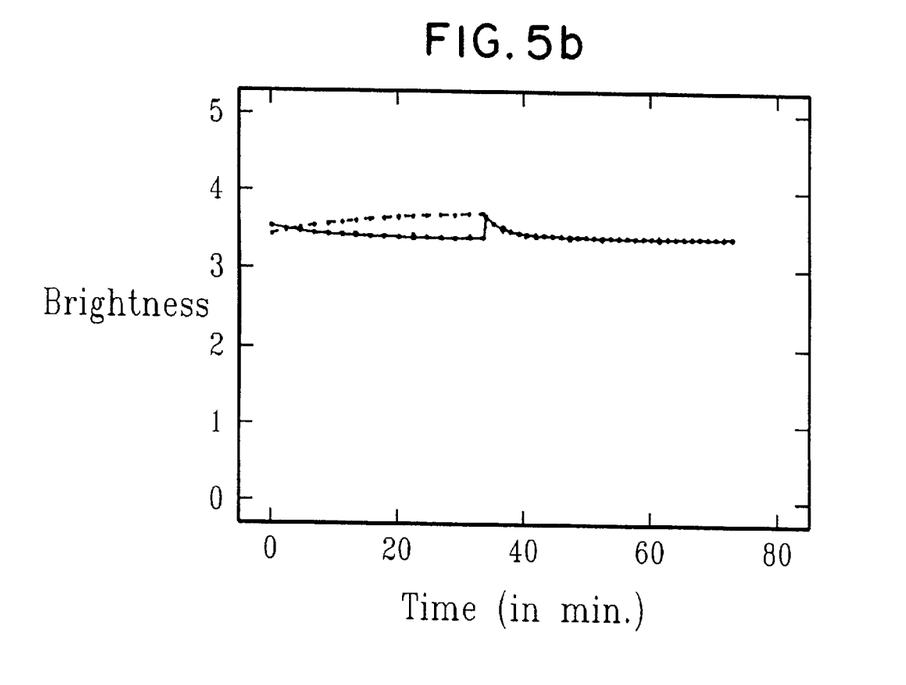

As we keep the latter constant, i.e. independent of the ion beam processing parameters any time dependent effect we observe is associated with charge migration in the polyimide. The results of a test carried out after a 75V ion beam alignment procedure showed no evidence of charge accumulation whereas the results from a 200V did. This is shown in FIGS. 5(*a*) and 5(*b*).

These measurements clearly show that the atomic beam alignment technique can be used to align liquid crystal displays provided the accelerating voltage is kept low. For polyimide and argon ions this is below 200V.

Muti-domain technology according to the present invention using particle beam alignment is classified into three groups. The first group is the pure particle beam alignment method. The second group is the combination of particle beam treatment and UV treatment. The third group is the combination of rubbing treatment and particle beam treatment.

Figure 8:
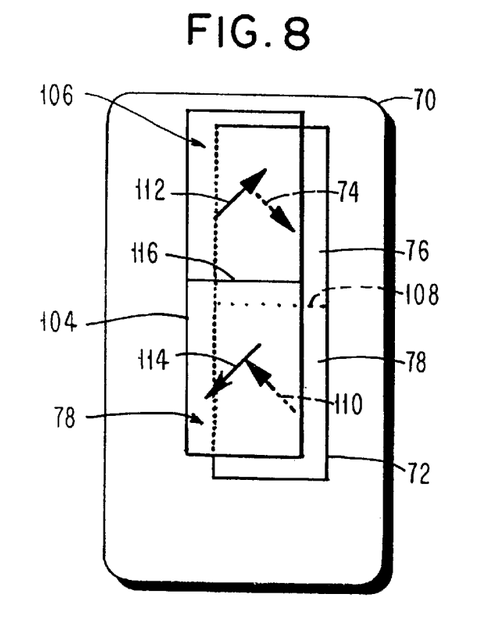
FIG. 8 shows a single pixel structure of a two domain TN display cell.
Figure 9A:
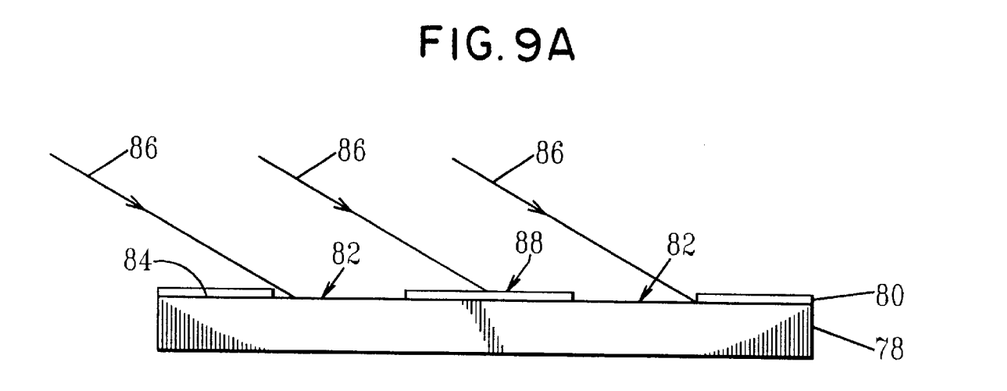
FIG. 9A schematically shows using a reset mask to form a pattern of exposed regions.
Figure 9B:
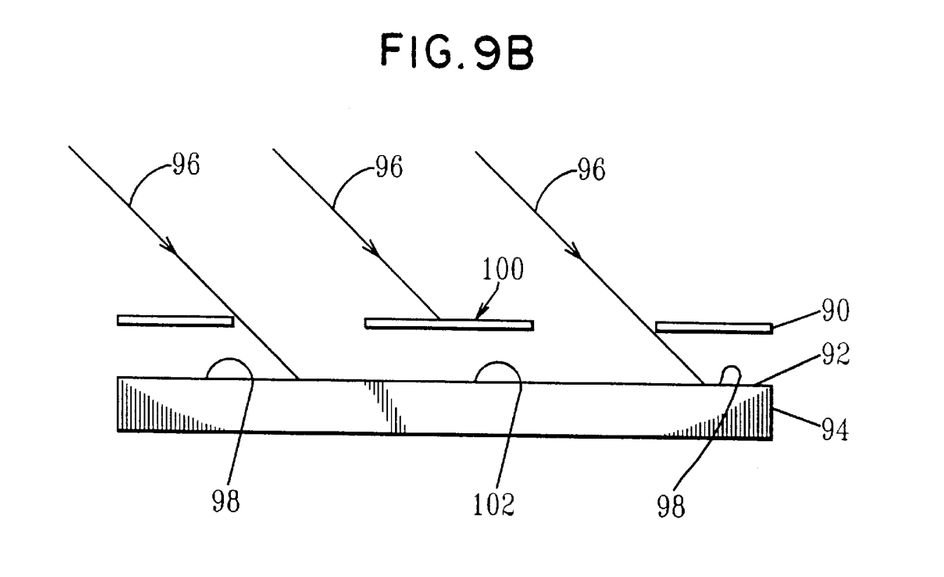
FIG. 9B schematically shows using a mechanical mask to form a pattern of exposed regions.

The embodiments of the first group are shown in FIGS. 8 to 12. Substrates are first coated with alignment material, such as polyimide (PI). They are then treated with ion beam bombardments. FIG. 8 shows the single pixel structure of the two-domain TN (twisted nematic). Box 70 represent the pixel boundary on the bottom substrate. A particle as described above bombards the substrate from a direction which makes an angle with the substrate normal. A arrow 74 and 10 represents the projection of the particle bombardment vector, which is formed by the direction of ion beam bombardment pointing from the particle source to the substrate, onto the bottom substrate plane. The bombardment of the particle beam with a proper energy and time results in a good alignment and proper pretilt angle for liquid crystal. The pretilt directions of the liquid crystal are the same for ion beam treatment and for mechanical rubbing if the projection direction of the ion beam bombardment vector is opposite to the rubbing direction. In FIG. 8, the pixel is divided into two domains 76 and 78 separated by boundary 108. The direction of the of the particle bombardment in each domain on the bottom substrate is different. This can be achieved as shown in FIG. 9A and FIG. 9B using a mask. In FIG. 9A substrate 28 has patterned mask 80, preferably a resist mask, disposed therein with regions 82 of the surface 84 of substrate 78 exposed to particle beam 86 which is blocked by mask 80 in region 88. Similarly, FIG. 9B schematically shows a mechanical mask 90 disposed adjacent surface 92 of substrate 94. Particle beam 96 exposes regions 98 of surface 92 but is blocked by region 100 of mask 90 so that region 102 of surface 92 is not exposed. The two directions 74 and 110 can be formed by the methods of FIGS. 9A and 9B. When one area of the pixel is bombarded, other areas are covered by a mechanical mask or a photoresist mask. However, the first bombardment can be done either with or without a mask since if no mask is used the direction of the second bombardment will overwrite the first bombardment direction. Box 104 represent the pixel boundary on the top substrate. Box 71 represents the domain boundary on the top substrate. Arrows 112 and 114 represent the projection of the particle beam bombardment vector onto the top substrate 106 plane. The direction of the ion bombardment 112 and 114 in each domain on the top substrate 106 is also different and separated by boundary 116. With these ion beam treatment on both bottom and top substrates, a two-domain TN panel will be formed after the panel is filled with a left handed chirality liquid crystal. If a right handed chirality liquid crystal is used, the ion beam bombardment direction should be changed accordingly.

Figure 10:
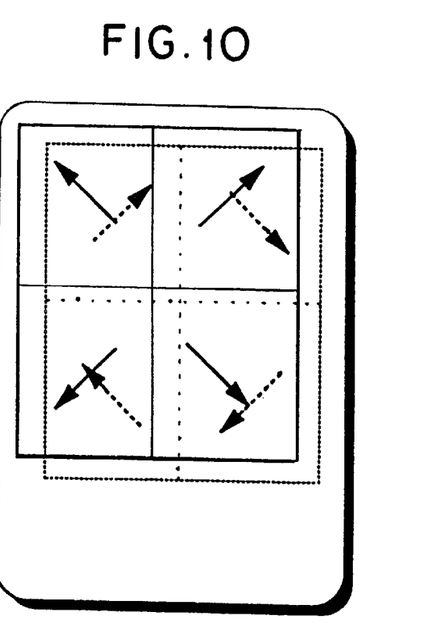
FIG. 10 schematically shows a single pixel structure having 4 domains having left handed chirality.
Figure 11:
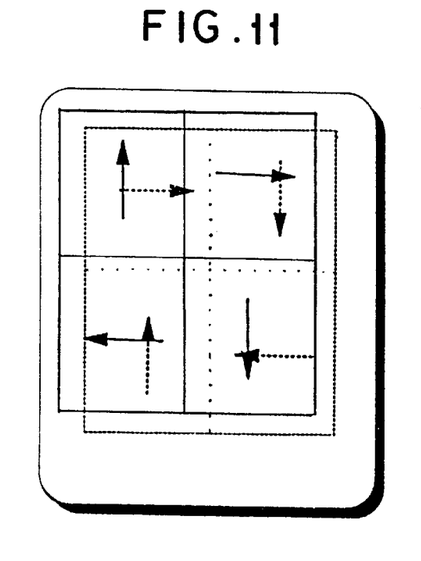
FIG. 11. schematically shows a single pixel structure having 4 domains having left handed chirality and 90° rotation from FIG. 10. Viewing characteristics will be different from that of FIG. 11.
Figure 12:
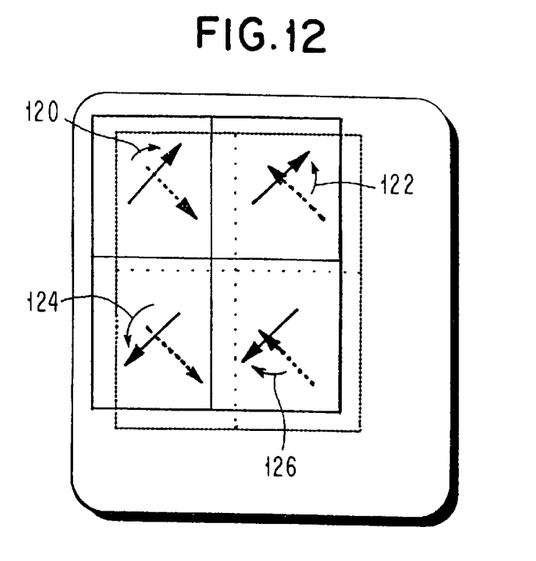
FIG. 12 schematically shows a single pixel structure having 4 domains having no chirality.
Figure 13:
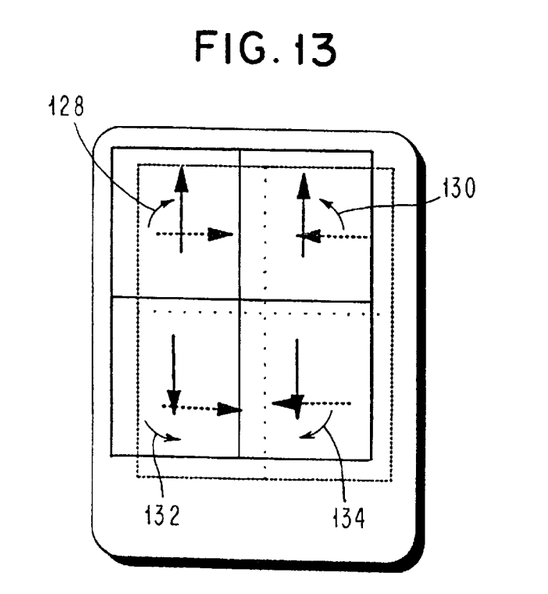
FIG. 13 schematically shows a single pixel structure having 4 domains having no chirality.
Figure 14:
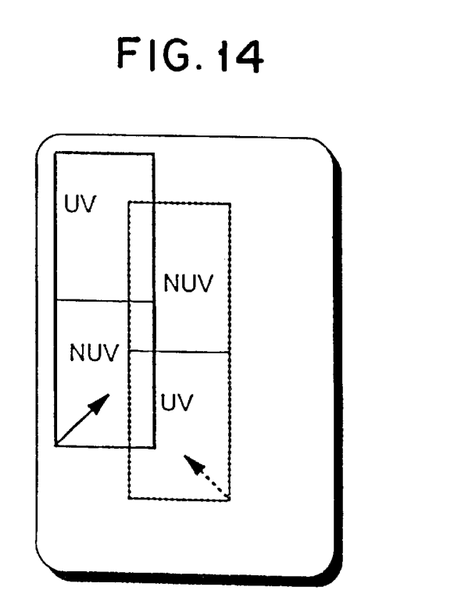
FIG. 14 schematically shows a single pixel having two domains formed by exposure to UV light and to a particle beam.

FIGS. 10 to 13 show single pixel structures for four-domain TN. The conventions for boxes and arrows are the same as those in FIG. 8. The basic concept is the same as that of Fig, 8, except a pixel is divided into four domains in FIG. 10 to 13 and a pixel is divided into two domains in FIG. 8. In FIGS. 10 and 11, a left handed chirality LC is used. Therefore, all four domains are left-handed twist with each domain tilting in different direction. In FIGS. 12 and 13, a non-chirality LC is used. Due to the arrangement of alignment directions for each domain, two domains (122, 124) are left-handed twist and other two domains (120, 126) are right handed twist. In FIGS. 10 and 11, each substrate requires four ion beam treatments. In FIGS. 12 and 13, each substrate requires only two ion beam treatments. One embodiment of the second group is shown in FIG. 14 (using left-handed twist for illustration. The conventions for line and arrows are the same as those in FIG. 8. Substrates are first coated with alignment material, such as PI. They are then exposed to the UV light with a photomask so that the areas which labeled UV are exposed to the UV light and the areas which labeled NUV are not exposed to the UV light. They are then treated with ion beam bombardments. The arrows indicate the direction of ion bombardment using same convention as before. The entire substrate is bombarded by ion beam in a single direction. No mask is required for ion beam treatment. Because the areas which are exposed to the UV light have a pretilt angle different from the areas which are not treated with the UV light. Therefore, combination of the UV treatment and the ion beam treatment a two-domain TN will be formed.

Figure 15:
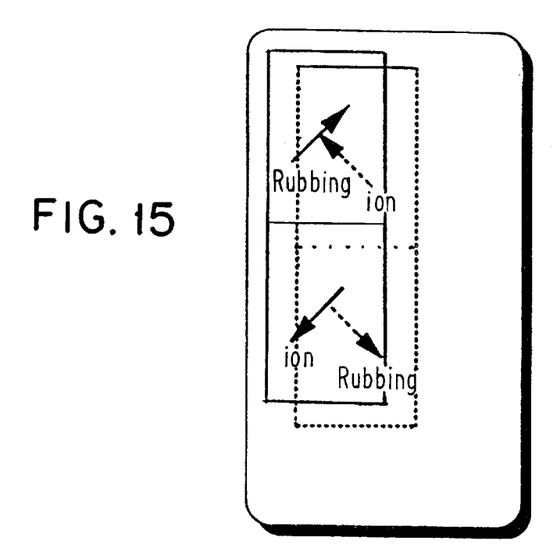
FIG. 15 schematically shows a single pixel having two domains formed by exposure to rubbing and particle beam bombardment.

The embodiment of the third group can be achieved by replacing the first ion beam bombardment with the rubbing treatment using the rubbing direction opposite to the direction of the projection of the ion beam bombardment vector for each substrate. As an example, the embodiment for the third group corresponding to FIG. 8 is shown in FIG. 15. The entire PI coated substrate is first exposed to a rubbing treatment in the direction labeled as Rub. The substrate is then treated with a ion beam bombardment in a direction labeled as ion using a mechanical mask or a photo-resist mask. The pretilt direction produced by the rubbing treatment will be overwritten by the direction of the particle beam treatment. By the combination of rubbing treatment and ion beam treatment the two-domain TN will be formed. By the same principle it is easy to convert FIGS. 10 to 13 of four-domian structures from pure particle beam treatment to the combination of rubbing treatment and the particle beam treatment.

We have found that mylar object can also be used to align liquid crystals. A two micron thin sheet of mylar was stretched across a rectangular frame and both surfaces of the mylar were exposed to a 200V beam. This mylar sheet was then sandwiched between two polyimide coated glass plates to form a paper-like display as taught in U.S. application Ser. No. 08/644,556 filed on May 10, 1996, now U.S. Pat. No. 5,801,796 entitled, "STACKED PARALLAX-FREE LIQUID CRYSTAL DISPLAY CELL", to A. Lowe filed on the same day herewith, the teaching of which is incorporated herein by reference.

While the present invention has been described with respect to preferred embodiments, numerous modifications, changes, and improvements will occur to those skilled in the art without departing from the spirit and scope of the invention.

We claim:

1. A method of generating a patterned alignment direction on an alignment surface for a liquid crystal display cell comprising:
   forming a first alignment direction on said alignment surface;
   forming a second alignment direction on said alignment surface;
   said first and said second alignment directions are formed by a sequence of treatments selected from a group consisting of a first sequence and a second sequence;
   said first sequence comprises a first step of rubbing said alignment surface and thereafter a second step of selectively exposing said alignment surface to a treatment selected from a group consisting of exposure to electromagnetic radiation and exposure to a particle beam;
   said second sequence comprises a first step of exposing said alignment surface to a treatment selected from a group consisting of electromagnetic radiation and a particle beam thereafter selectively exposing said alignment surface to another particle beam;
   said particle beam and said another particle beam are said first particle beam and said second particle beam are directed at said surface at an adjustable energy, at an adjustable angle with respect to said alignment surface and at an adjustable time to adjust the pretilt angle of a liquid crystal molecule with respect to said alignment surface.

2. A method according to claim 1, wherein before said second step of said first sequence and before said second step of said second sequence a mask is used in said second step of said first sequence and in said second step of said second sequence to provide a means for selectively exposing said alignment surface.

3. A method according to claim 2, wherein said mask is selected from the group consisting of a patterned resist disposed on said alignment surface and a mechanical mask.

4. A method according to claim 1, wherein said method forms a plurality of domains within a pixel of said liquid crystal display, each of said domains having a different orientation of said alignment direction.

5. A method according to claim 4 wherein each of said first and said second alignment surfaces has a plurality of pixel forming regions, each of said pixel forming regions has a plurality of domains each having a different alignment direction forming a multi-domain pixels.

6. A method according to claim 1, wherein there are a first and a second alignment surfaces which are disposed spaced apart facing each other forming a space therebetween which is filled with a liquid crystal material.

7. A method according to claim 1, wherein said electromagnetic radiation is ultraviolet radiation.

8. A method according to claim 1, wherein said particle beam is selected from the group consisting of an ion beam, a neutral atomic beam, electron, a molecular beam and an elementary particle beam.

9. A method according to claim 1, wherein said particle beam is controlled by controlling a parameter selected from the group consisting of angle of incidence of said particle beam, energy of said particle beam, time for exposure of said alignment surface to said particle beam.

10. A method according to claim 9, wherein said alignment surface is a polymer.

11. A method according to claim 12, wherein said particle beam has a value of said adjustable energy, a value of said adjustable angle, and a value of said adjustable time to result in said particle beam interacting only within a distance from said surface sufficient to result in said alignment but insufficient to introduce defects in said alignment surface.

12. A method according to claim 11, wherein said defects is charge stored in said alignment substrate.

13. A method according to claim 1, wherein said adjustable energy is greater than 10 volts.

14. A method according to claim 11, wherein said adjustable energy is from about 75V to about 500V.

15. A method according to claim 1, wherein said angle is from about 0° to about 90°.

16. A method according to claim 1, wherein said time is far greater than 10 seconds.

17. A method comprising:
   selectively exposing a surface to electromagnetic radiation so that there are exposed parts of said surface exposed to said radiation and unexposed parts of said surface unexposed to said radiation;
   exposing said exposed parts and said unexposed parts to a particle beam.

18. A method according to claim 17, wherein said surface is an alignment surface.

19. A method according to claim 18, wherein said alignment surface is a polyamide.

20. A method of generating a patterned alignment direction on an alignment surface for a liquid crystal display cell comprising:
   forming a first alignment direction on said alignment surface;
   forming a second alignment direction on said alignment surface;
   said first and said second alignment directions are formed by a sequence of treatments selected from a group consisting of a first sequence and a second sequence;
   said first sequence comprises a first step of rubbing said alignment surface and thereafter a second step of selectively exposing said alignment surface to a treatment selected from a group consisting of exposure to electromagnetic radiation and exposure to a particle beam;
   said second sequence comprises a first step of exposing said alignment surface to a treatment selected from a group consisting of electromagnetic radiation and a particle beam and thereafter a second step of selectively exposing said alignment surface to another particle beam;
   before said second step of said first sequence and before said second step of said second sequence a mask is used in said second step of said first sequence and in said second step of said second sequence to provide a means for selectively exposing said alignment surface;
   said mask is selected from a group consisting of a patterned resist disposed on said alignment surface and a mechanical mask;
   said method forms a plurality of domains within a pixel of said liquid crystal display, each of said domains having a different orientation of said alignment direction;
   there are first and second alignment surfaces which are disposed spaced apart facing each other forming a space therebetween which is filled with a liquid crystal material;
   each of said first and said second alignment surfaces has a plurality of pixel forming regions, each of said pixel forming regions has a plurality of domains each having a different alignment direction forming a plurality of multi-domain pixels;

said particle beam is selected from the group consisting of an ion beam, a neutral atomic beam, electron beam, a molecular beam and an elementary particle beam;

said particle beam is controlled by controlling a parameter selected from the group consisting of angle of incidence of said particle beam, energy of said particle beam, time for exposure of said alignment surface to said particle beam;

a method of generating a patterned alignment direction on an alignment surface for a liquid crystal display cell comprising:

forming a first alignment direction on said alignment surface;

forming a second alignment direction on said alignment surface;

said first and said second alignment directions are formed by a sequence of treatments selected from the group consisting of a first sequence and a second sequence;

said first sequence comprises a first step of rubbing said alignment surface and thereafter a second step of selectively exposing said alignment surface to a treatment selected from the group consisting of exposure to electromagnetic radiation and exposure to a particle beam;

said second sequence comprises a first step of exposing said alignment surface to a treatment selected from the group consisting of electromagnetic radiation and a particle beam thereafter selectively exposing said alignment surface to another particle beam.

* * * * *